Patented Jan. 4, 1944

2,338,600

UNITED STATES PATENT OFFICE 2,338,600

SELECTIVE SOLVENT FOR OLEFINS

Richard F. Robey, Roselle, and Raphael Rosen, Elizabeth, N. J., assignors to Standard Oil Development Company, a corporation of Delaware No Drawing. Application August 19, 1939,
Serial No. 291,006

3 Claims. (Cl. 260—677)

This invention relates to the separation of olefin gases, particularly ethylene and other lower olefins, from gas mixtures containing the same in conjunction with saturated hydrocarbon gases and others, and in particular, this invention relates to the separation of olefin gases from gaseous mixtures by absorbing the olefins in a solution of a cuprous salt in certain organic solvents.

The use of olefin gases is becoming more and more widespread with the exploitation of such reactions as sulfation, hydration, and polymerization. The steadily increasing demand for olefins, especially the lower olefins to which these reactions are most commonly applied, must be supplied largely by the petroleum industry from cracking gases. These gases contain, in addition to olefins, hydrogen and saturated hydrocarbon gases, for example, methane and its homologues, and others. Olefin gases, especially ethylene, are also in great demand in the chemical industry and elsewhere, as for example, in fruit growing where they are used for pest control and fruit ripening.

Substantially pure olefins are required for optimum results in a number of commercial practices, such as polymerization and allied reactions.

It is desirable to remove contaminating substances, for example, saturated hydrocarbons, acetylene, and carbon monoxide, from the olefin gas mixture before subjecting the olefins to polymerization, etc. The presence of saturated hydrocarbons in the olefin gas mixtures impedes the desired reactions due to their diluent effect; when such hydrocarbons are present, longer times of contact, larger equipment, and varying temperatures, pressures, catalyst concentrations, etc. to meet the changing feed compositions, are required.

The lower olefins, for example, ethylene, propylene, butylene, 1,3-butadiene, etc., are volatile at ordinary room temperatures and, upon being heated, expand and develop pressures. In the storage and transportation of the lower olefins, it has been necessary heretofore to provide steel bottles, tanks, or containers of special construction, including tank cars and multiple-unit assemblies having thick walls and necessarily great weight in order that sufficiently large quantities of the olefins might be compressed and stored therein to make the units commercially useful.

It is an object of this invention to provide a new method or process for recovering ethylenic hydrocarbons, or olefins, from mixtures containing the same, also new and improved selective solvent mixtures or compositions for effecting said recovery, and absorbent materials of improved absorptive power which will hold olefins in solution or in combination and allow the other gases in a mixture to pass through the solution unabsorbed, thus separating the olefins from other gases, particularly from other hydrocarbon gases having the same or approximately the same number of carbon atoms per molecule. The absorbed olefins may be recovered from the solution after absorption by heating the solution and/or reducing the pressure of the system in which the solution is held.

Another object of this invention is to increase the deliverable-gas capacity of gas bottles or storage tanks in a given pressure range by storing purified olefins in the containers in the form of a solution in said solvent materials.

The commercial fractionation of gaseous mixtures is a costly and tedious operation and usually gives incomplete separation of the several components of a mixture. The separation or removal of methane from gas mixtures is particularly difficult. Unsatisfactory results are obtained when using procedures involving separation of the components of a gaseous mixture by selective adsorption on solids. The best results are obtained by the use of liquid absorbents. Cuprous chloride solutions exhibit a particular selectivity for olefins and are used to absorb the latter from gaseous mixtures, thus separating them from the other gas components, particularly saturated hydrocarbons. Since cuprous salts are practically insoluble in water alone, it has been found necessary in the past to dissolve cuprous salts, such as cuprous chloride, in aqueous acids, aqueous ammonia, aqueous amines, etc. The use of these solutions results in operative difficulties, such as corrosion of apparatus by the solution in the case of acids, loss of ammonia or the necessity of an additional operation for the recovery thereof, or in low take-up of olefins from gas mixtures.

We have found that solutions of cuprous salts, such as cuprous sulphocyanate, cuprous chloride, etc., in certain organic materials, have an unexpectedly high selective solvent action on ethylene and its homologues. Materials found to have exceptional olefin-solvent action when used in combination with cuprous salts are ethers, nitriles, and organic phosphates, e. g. dioxane, aceto-nitrile, tri-cresyl phosphate, and other alkyl and aryl nitriles and alkyl and aryl phosphates.

The olefin-absorbing solutions are prepared by saturating the ether, nitrile, or phosphate with the cuprous salt. Only a small amount of cuprous salt is required. Saturation is maintained by using a slight excess of the cuprous salt.

In carrying out the invention, the mixture containing the desired olefins may be contacted with the cuprous salt solution in either a batchwise or continuous fashion, but preferably continuously in a countercurrent tower.

Suitable temperatures for absorbing olefins in solutions of cuprous salts in organic solvents are −10° C. to +30° C. The absorption can be carried out at atmospheric pressure, although higher pressures are preferable. On being contacted with the gas mixture containing olefins, saturated hydrocarbons, etc., the cuprous salt solution dissolves the olefins preferentially, the cuprous salt presumably forming an addition compound with them.

After absorption, the olefins may be recovered in any known manner, such as by heating the solution and/or by reducing the pressure of the system in which the solution is held.

The ethylene absorptive power of a saturated solution of cuprous sulphocyanate in dioxane is shown in the following tabular comparison:

| Ethylene solvent | Ethylene take-up | Temp. | Press. |
|---|---|---|---|
| | Vols./ vol. of solvent | °C. | Mm. |
| Dioxane | 2.4 | 25–30 | 760 |
| Cuprous sulphocyanate (dry) | 0.0 | 25–30 | 760 |
| Dioxane saturated with cuprous sulphocyanate | 6.0 | 25–30 | 760 |

It can be seen in the above table that an increase of 250% in the take-up of ethylene is obtained by the use of dioxane saturated with cuprous sulphocyanate over dioxane alone.

The absorptive power of this solution for higher olefins is even greater. This high absorptive power has an important and useful application in concentrating and storing olefin gases, as already explained. The use of saturated solutions of cuprous salts in organic solvents in storing olefin gases is analogous to the use of acetone in the concentration and storage of acetylene.

It has been found that saturated solutions of cuprous salts in alkyl and aryl nitriles, e. g. benzonitrile and acetonitrile, and aryl and alkyl phosphates, e. g. tricresyl phosphate, exhibit olefin absorption properties similar to those of saturated solutions of cuprous salts in dioxane.

Selective absorption of any one particular olefin can be accomplished by pressure and temperature manipulations in the absorption and regeneration processes.

This invention is not to be limited to the specific embodiments shown or to the specific examples given, nor to any theories advanced as to the operation of the invention.

We claim:

1. The method of separating olefins from gas mixtures containing the same, comprising selectively absorbing the olefins in a saturated solution of cuprous sulphocyanate in dioxane.

2. The method of separating olefins from gas mixtures containing the same comprising selectively absorbing the olefins in a saturated solution of a cuprous salt in dioxane.

3. The method of separating olefins from gas mixtures containing the same comprising selectively absorbing the olefins in a saturated solution of cuprous chloride in dioxane.

RICHARD F. ROBEY.
RAPHAEL ROSEN.